United States Patent [19]
Nishimura

[11] Patent Number: 4,701,693
[45] Date of Patent: Oct. 20, 1987

[54] SOLAR BATTERY CIRCUIT

[75] Inventor: Toshio Nishimura, Jyoyo, Japan

[73] Assignee: Sharp Kabushiki Kaisha, Osaka, Japan

[21] Appl. No.: 839,993

[22] Filed: Mar. 17, 1986

[30] Foreign Application Priority Data

Mar. 19, 1985 [JP] Japan .................. 60-56355

[51] Int. Cl.$^4$ .............................. H02J 9/04
[52] U.S. Cl. .................... 323/303; 323/906; 307/66; 320/1
[58] Field of Search ........ 323/299, 303, 906; 320/1, 2; 307/64, 66; 136/292, 293

[56] References Cited

U.S. PATENT DOCUMENTS

| | | | |
|---|---|---|---|
| 3,600,599 | 8/1971 | Wright et al. | 323/906 X |
| 4,134,057 | 1/1979 | Portmann | 323/906 X |
| 4,266,178 | 5/1981 | Asakawa | 323/906 X |
| 4,434,395 | 2/1984 | Higuchi | 320/1 |

FOREIGN PATENT DOCUMENTS 3534008  3/1986  Fed. Rep. of Germany .

OTHER PUBLICATIONS

Takehada Yamada, "No Battery Analog Quartz Watch" 11th International Congress for Chronometry, Oct. 1984, Reports 2, pp. 75-79.

Primary Examiner—Peter S. Wong
Attorney, Agent, or Firm—Birch, Stewart Kolasch & Birch

[57] ABSTRACT

A solar power circuit for an electronic apparatus includes a solar power circuit including a solar battery, and a capacitor for storing an extra voltage between a solar power voltage and a source voltage supply necessary for driving the apparatus.

2 Claims, 2 Drawing Figures

SOLAR BATTERY CIRCUIT

BACKGROUND OF THE INVENTION

The present invention relates to an electronic circuit for an electronic apparatus and, more particularly, to a solar battery circuit for driving an electronic apparatus.

When an electronic apparatus is driven with solar energy, the interruption of the solar light impinging on the electronic apparatus switches the apparatus OFF, so that the calculation results and the data stored in a memory may disappear, conventionally, in 1 or 2 seconds. It may be possible to provide a large capacity condenser. However, this needs a long charging time for the condenser, which is practical.

SUMMARY OF THE INVENTION

Accordingly, it is an object of the present invention to provide an improved solar circuit for an electronic apparatus for storing extra power energy between the solar power source and a source voltage supply needed for driving the apparatus.

It is another object of the present invention to provide an improved solar power circuit for an electronic apparatus for storing extra solar energy between the solar power source and a source voltage supply necessary for driving the apparatus, so that the stored extra solar energy can be used to preserve data stored in a memory in the apparatus.

Briefly described, in accordance with the present invention, a solar power circuit for an electronic apparatus comprises a solar power circuit including solar battery means, and storage means for storing extra solar power between the generated solar power voltage and a source voltage level needed for driving the apparatus, when the solar battery means may provide the extra solar power voltage over the source voltage level.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
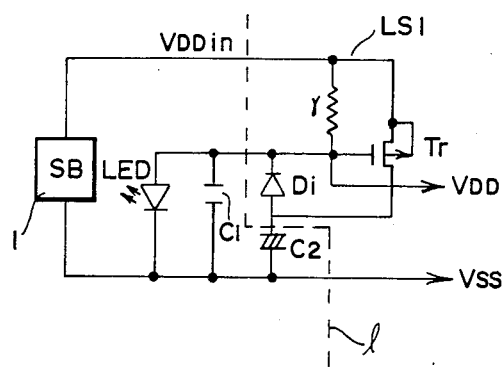
FIG. 1 is a block diagram of a solar power circuit according to a preferred embodiment of the present invention.

FIG. 1 is a block diagram of a solar power circuit in an electronic apparatus of the present invention.

Referring to FIG. 1, the solar power circuit of the present invention comprises a solar battery (SB) 1, and a Large Scale Integrated Circuit (LSI) for receiving a solar power voltage $V_{DDin}$ generated by the SB 1 to power and drive the electronic apparatus. The LSI is positioned rightside from a broken line 1 in FIG. 1.

Within the LSI, $V_{DD}$ is $+1.5$ V and $V_{SS}$ is at ground potential. A light emitting diode (LED) is provided as a constant voltage supplier, which is driven with $V_{DD}$. A forward voltage ($V_f$) of the LED is 1.5 V. In FIG. 1, the inner voltage ($V_{DDin} - V_{SS}$) of the SB 1 is about 0 to 2.8 V. A resistance r of the LSI is provided for limiting the current passing through the LED. A condenser C1 is provided for protecting the malfunction of the apparatus due to the interruption of the solar light for a very short time. The protection period of this condenser C1 only is about 1 to 2 seconds, normally.

A P-channel MOS transistor Tr is provided whose threshold voltage $V_{th}$ is set at $-0.3$ V. When the transistor Tr is conductive, the extra voltage generated by the SB 1 can be reserved in a condenser C2. The capacitance of the condenser C2 is selected to be much greater than that of the condenser C1.

First, voltage can be applied to the LSI through the resistance r when the following condition occurs:

Operation Voltage of LSI $\leq V_{DDin} < 1.5$ V

The current consumed in the LSI is very small so that the voltage drop by the resistance r can be neglected. Therefore, $V_{DDin} \approx V_{DD}$. That is, $V_{DDin} - V_{DD} \approx 0$. The transistor Tr is placed in a nonconductive to pass no current through the condenser C2.

Second, when the condition of $1.5$ V $\leq V_{DDin} - 1.8$ V stands, some current can start to pass through the LED because the source voltage $V_{DD}$ is more than 1.5 V. Then, the source voltage $V_{DD}$ is limited to the forward voltage $V_f$ of the constant voltage LED. Further, since $V_{DDin} - V_{DD} < 0.3$ V, the voltage difference between $V_{DDin}$ and $V_{DD}$ is less than the threshold Vth of transistor Tr to keep the transistor Tr OFF.

However, when $1.8$ V $\leq V_{DDin}$, the condition of $V_{DDin} - V_{DD} \geq 0.3$ V can occur, so that this voltage difference can exceed the threshold Vth of the transistor Tr. The transistor Tr is switched to a conductive state and the condenser C2 can start to be charged.

At the initial charge (charge Q=0) of the condenser C2, a large current may pass through the transistor Tr to thereby reduce $V_{DDin}$. However, when the condition of $V_{DDin} - V_{DD} < 0.3$ V stands, the transistor Tr is switched nonconductive again and the current to the condenser C2 is stopped.

A diode Di is connected to condenser C2 for preventing a current from passing into the condenser C2 through the resistance r when backup to the $V_{DD}$ is carried out.

With the above-described circuit arrangement, when $V_{DDin}$ is much greater than $V_{DD}$, the extra charge can be stored in the condenser C2. As soon as the condenser C2 is saturated (the addition of $V_{DD}$ and the forward voltage of the diode Di), the stored charge can flow in the LED through the transistor Tr and the diode Di. Because the capacitance of the condenser C2 is much greater than that of the condenser C1, the voltage of the source voltage $V_{DD}$ can be maintained for a long time through the diode Di as long as the condenser C2 has been charged up once, even after the solar energy supply is stopped from the SB 1.

The threshold voltage Vth of the transistor Tr is selected to be 0.3 V by referring to the variations of the elements and the manufacturing conditions of the transistors. Therefore, such a value is not limited to 0.3 V.

Figure 2:
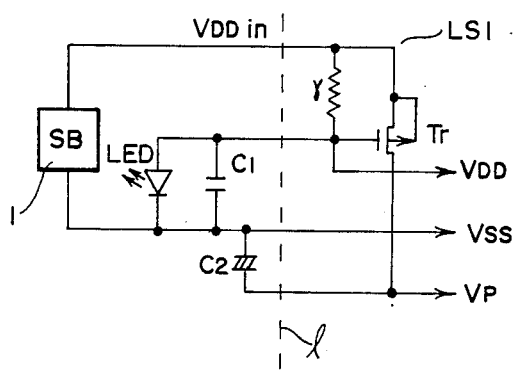
FIG. 2 is a block diagram of a solar power circuit of an electronic apparatus according to another preferred embodiment of the present invention.

FIG. 2 is a block diagram of a polar power circuit according to another preferred embodiment of the present invention.

In FIG. 2, like elements identical to those in FIG. 1 are indicated by like numeral and characters.

The circuit of FIG. 2 is to additionally provide a buzzer voltage Vp for driving an additional element such as a piezoelectric buzzer. The piezoelectric buzzer, although not limited to, consumes a large current in a short circuit.

The operational principle of the circuit of FIG. 2 is the same as that of FIG. 1.

The value of the voltage Vp may greater than $V_{DD}$. In the circuit of FIG. 2, the voltage $V_{DD}$ is not back up and the power is consumed for the different voltage, so that the diode Di is eliminated.

According to the present invention, when the solar power voltage exceeds the necessary voltage for driving the apparatus, the extra voltage is stored within the condenser C2. With the help of the present invention, the application of the solar power energy can be expanded.

While only certain embodiments of the present invention have been described, it will be apparent to those skilled in the art that various changes and modifications may be made therein without departing from the spirit and scope of the present invention as claimed.

What is claimed is:

1. A solar power supply circuit comprising:
   solar battery means for generating a power voltage in response to incident light;
   power supply means for generating a constant supply voltage at an output terminal in response to said power voltage, when said power voltage is above a first predetermined level;
   first condenser means connected across said power supply means for backing up said constant supply voltage in response to a temporary absence of said incident light;
   second condenser means for storing supplemental back up power for said power supply circuit, said second condenser means providing said supplemental back up power to said output terminal in response to a temporary absence of said incident light, for a period longer than that of said first condenser means; and
   switching means, connected to said polar battery means, for charging said second condenser means when said power voltage is above a second predetermined level;
   said switching means including MOS transistor means having source and drain terminals connected between said solar battery means and said second condenser means, resistor means connecting a gate terminal of said MOS means to said solar battery means, said gate terminal also being connected to said output terminal.

2. The circuit of claim 1, wherein the capacitance of the second condenser means is greater than the capacitance of the first condenser means.

* * * * *